(12) United States Patent
Wu

(10) Patent No.: US 9,754,150 B2
(45) Date of Patent: Sep. 5, 2017

(54) FINGERPRINT IDENTIFICATION MODULE

(71) Applicant: Gingy Technology Inc., Hsinchu (TW)

(72) Inventor: Jen-Chieh Wu, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 54 days.

(21) Appl. No.: 14/973,686

(22) Filed: Dec. 17, 2015

(65) Prior Publication Data

US 2017/0011251 A1    Jan. 12, 2017

Related U.S. Application Data

(60) Provisional application No. 62/190,267, filed on Jul. 9, 2015.

(30) Foreign Application Priority Data

Oct. 19, 2015   (TW) .............................. 104134209 A

(51) Int. Cl.
*G06K 9/00*   (2006.01)

(52) U.S. Cl.
CPC ....... *G06K 9/00087* (2013.01); *G06K 9/0004* (2013.01); *G06K 9/00046* (2013.01)

(58) Field of Classification Search
None
See application file for complete search history.

(56) References Cited

U.S. PATENT DOCUMENTS

| | | | | |
|---|---|---|---|---|
| 7,030,860 B1* | 4/2006 | Hsu | ......................... | G06F 3/044 178/18.06 |
| 8,860,683 B2* | 10/2014 | Baumbach | .......... | G06F 3/03547 345/174 |
| 8,866,347 B2* | 10/2014 | Benkley, III | ........... | G01N 27/04 307/116 |
| 8,888,004 B2* | 11/2014 | Setlak | .................. | G06K 9/0002 235/439 |

(Continued)

FOREIGN PATENT DOCUMENTS

| | | |
|---|---|---|
| CN | 102844769 | 12/2012 |
| CN | 104063094 | 9/2014 |

(Continued)

OTHER PUBLICATIONS

Tang, H., et al. "Pulse-echo ultrasonic fingerprint sensor on a chip." Solid-State Sensors, Actuators and Microsystems (Transducers), 2015 Transducers—2015 18th International Conference on. IEEE, 2015.*

(Continued)

*Primary Examiner* — Andrae S Allison
(74) *Attorney, Agent, or Firm* — Jianq Chyun IP Office

(57) ABSTRACT

A fingerprint identification module including a cover plate, a fingerprint identification sensor, a first adhesive layer, and at least one light source is provided. The cover plate has an inner surface, an outer surface opposite to the inner surface, and a plurality of microstructures located at the inner surface. The fingerprint identification sensor is located under the microstructures and attached to the microstructures (Continued)

through the first adhesive layer. The at least one light source is located under the inner surface and adjacent to the fingerprint identification sensor.

10 Claims, 2 Drawing Sheets

(56) References Cited

U.S. PATENT DOCUMENTS

| | | | | |
|---|---|---|---|---|
| 8,890,016 | B2* | 11/2014 | Silverman | H01H 13/14 200/341 |
| 9,460,332 | B1* | 10/2016 | Bussat | G06K 9/0002 |
| 2004/0252867 | A1* | 12/2004 | Lan | G06K 9/0004 382/124 |
| 2011/0310044 | A1* | 12/2011 | Higuchi | G06F 1/1684 345/173 |
| 2013/0279769 | A1* | 10/2013 | Benkley, III | G06K 9/00013 382/124 |
| 2014/0218339 | A1* | 8/2014 | Hotelling | G06F 3/044 345/174 |
| 2014/0241595 | A1* | 8/2014 | Bernstein | G06K 9/0002 382/124 |
| 2015/0036065 | A1* | 2/2015 | Yousefpor | G06K 9/228 349/12 |
| 2015/0135108 | A1* | 5/2015 | Pope | G06K 9/00006 715/767 |
| 2015/0185983 | A1* | 7/2015 | Yang | G06F 3/03547 345/173 |
| 2015/0363632 | A1* | 12/2015 | Ahn | G06F 3/0412 382/124 |
| 2016/0004899 | A1* | 1/2016 | Pi | G06F 1/1626 345/173 |
| 2016/0227081 | A1* | 8/2016 | Chang Chien | H04N 5/2254 |
| 2016/0328597 | A1* | 11/2016 | Abiko | G06K 9/3233 |
| 2016/0364595 | A1* | 12/2016 | Du | G06K 9/0002 |
| 2016/0379039 | A1* | 12/2016 | Dagan | G06F 3/0412 382/124 |
| 2017/0061193 | A1* | 3/2017 | Young | G06K 9/00013 |
| 2017/0083745 | A1* | 3/2017 | Goodelle | G06K 9/0004 |

FOREIGN PATENT DOCUMENTS

| | | |
|---|---|---|
| CN | 204406424 | 6/2015 |
| TW | 201032145 | 9/2010 |

OTHER PUBLICATIONS

"Office Action of Taiwan Counterpart Application", issued on Apr. 13, 2016, p. 1-p. 5.

* cited by examiner

FINGERPRINT IDENTIFICATION MODULE

CROSS-REFERENCE TO RELATED APPLICATION

This application claims the priority benefits of U.S. provisional application Ser. No. 62/190,267, filed on Jul. 9, 2015 and Taiwan application serial no. 104134209, filed on Oct. 19, 2015. The entirety of each of the above-mentioned patent applications is hereby incorporated by reference herein and made a part of this specification.

BACKGROUND

Field of the Invention

The invention is directed to an optical module and more particularly, to a fingerprint identification module.

Description of Related Art

With increasing advancement in technology industry, electronic apparatuses, such as tablet computers and smart phones have been widely applied in everyday life. Each electronic apparatus is commonly set with a password lock to enhance security of use. However, in order to unlock the password lock, a user has to input a password every time before using the electronic apparatus. To mitigate the burden of inputting the passwords during unlocking in the related art and to improve convenience and security of the use of the electronic apparatus, manufacturers start to study how to install a fingerprint identification module in the electronic apparatus for identity identification by using unique fingerprint information of human fingers.

SUMMARY

The invention is directed to a fingerprint identification module with good identification performance.

The invention provides a fingerprint identification module, including a cover plate, a fingerprint identification sensor, a first adhesive layer and at least one light source. The cover plate has an inner surface, an outer surface opposite to the inner surface, and a plurality of microstructures located at the inner surface. The fingerprint identification sensor is located under the microstructures and attached to the microstructures through the first adhesive layer. The at least one light source is located under the inner surface and adjacent to the fingerprint identification sensor.

In an embodiment of the invention, the cover plate is a glass cover plate of a display apparatus or a glass cover plate of a touch apparatus.

In an embodiment of the invention, the microstructures are hollow structures recessed in the inner surface.

In an embodiment of the invention, the microstructures are prism structures or columnar structures protruding from the inner surface.

In an embodiment of the invention, the microstructures and the cover plate are integrally formed.

In an embodiment of the invention, the fingerprint identification module further includes a second adhesive layer, and the microstructures is attached to the inner surface of the cover plate through the second adhesive layer.

In an embodiment of the invention, the second adhesive layer is a light-curing adhesive layer.

In an embodiment of the invention, the fingerprint identification sensor is an optical fingerprint identification sensor or a photoelectric hybrid fingerprint identification sensor.

In an embodiment of the invention, the first adhesive layer is a light-curing adhesive layer.

In an embodiment of the invention, an amount of the at least one light source is plural, and the light sources are respectively disposed at each side, each corner or a combination thereof of the fingerprint identification sensor.

To sum up, the invention can facilitate in improving the identification performance of the fingerprint identification sensor by centralizing and aggregating a light beam reflected by a finger on the fingerprint identification sensor with the disposition of the microstructures. In addition, the fingerprint identification sensor is directly attached to the microstructures, such that an optical path length between the finger and the fingerprint identification sensor can be shortened, which contributes to reducing an amount of signal attenuation resulted from the optical path length. Therefore, the fingerprint identification module of the invention can have good identification performance.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
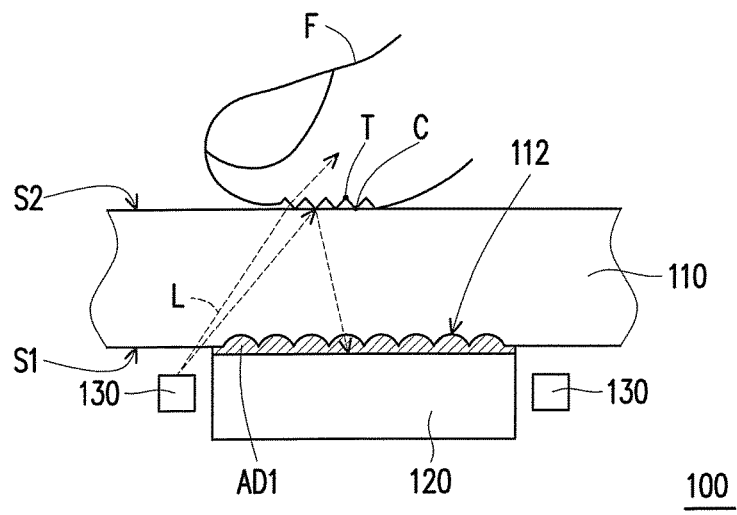
FIG. 1A is a schematic partially cross-sectional diagram illustrating a fingerprint identification module according to a first embodiment of the invention.
Figure 1B:
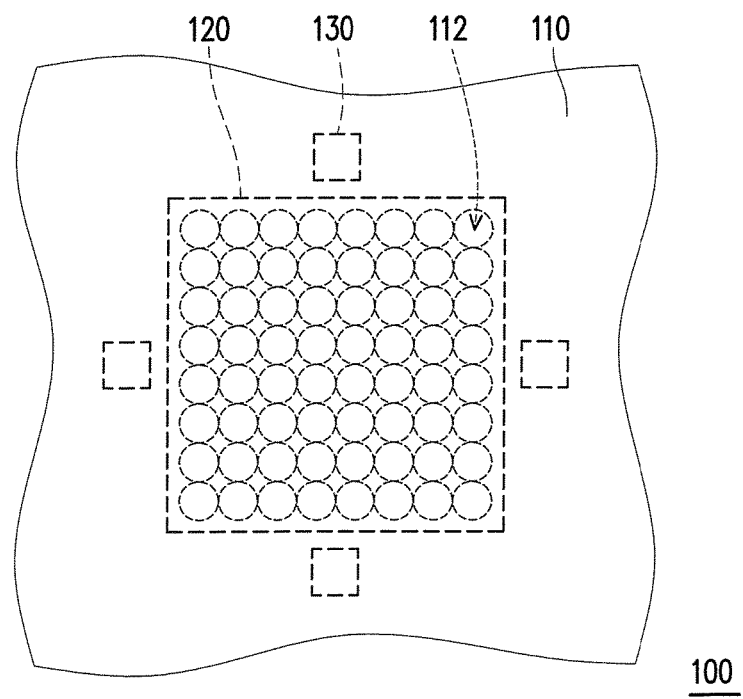
FIG. 1B is a schematic partially top-view diagram illustrating the fingerprint identification module according to the first embodiment of the invention.

FIG. 1A is a schematic partially cross-sectional diagram illustrating a fingerprint identification module according to a first embodiment of the invention. FIG. 1B is a schematic partially top-view diagram illustrating the fingerprint identification module according to the first embodiment of the invention. Referring to FIG. 1A and FIG. 1B, a fingerprint identification module 100 includes a cover plate 110, a fingerprint identification sensor 120, a first adhesive layer AD1 and at least one light source 130.

The cover plate 110 has an inner surface S1, an outer surface S2 and a plurality of microstructures 112. The outer surface S2 and the inner surface S1 are opposite to each other, and the outer surface S2 is a touch operation surface of the fingerprint identification module 100. In other words, a user touches the outer surface S2 of the cover plate 110 with his/her finger F for fingerprint identification. The cover plate 110 may employ a substrate with high mechanical strength to prevent elements under the cover plate 110 from being damaged due to the pressing of the finger F or other impact of an external force. In addition, the cover plate 110 may be made of a transparent material to prevent a light beam L from the light source 130 from being shielded. The transparent material generally refers to a material with high transmittance, which is not limited to the material having transmittance of 100%. For example, the cover plate 110 may be a glass cover plate, such as a glass cover plate of a display apparatus or a glass cover plate of a touch apparatus, but the invention is not limited thereto.

The microstructures 112 are located at the inner surface S1 of the cover plate 110, and the microstructures 112 may be arranged in an array as shown in FIG. 1B, but the invention is not limited thereto. Referring to FIG. 1A, the microstructures 112 and the cover plate 110 may be integrally formed. In addition, the microstructures 112 may be hollow structures recessed in the inner surface S1. Specifically, the microstructures 112 may be formed by removing part of the cover plate 110. Namely, the microstructures 112 may be formed by a block substrate through a removal process, but the invention is not limited thereto. In another embodiment, the microstructures 112 and the cover plate 110 may be simultaneously manufactured in a molding manner.

The fingerprint identification sensor 120 is located under the microstructures 112. The fingerprint identification sensor 120 is adapted to receive the light beam L reflected by the finger F, so as to identify the user's identify. For example, the fingerprint identification sensor 120 may be an optical fingerprint identification sensor or a photoelectric hybrid fingerprint identification sensor, but the invention is not limited thereto.

The fingerprint identification sensor 120 is attached to the microstructures 112 through the first adhesive layer AD1. Referring to FIG. 1A, only the first adhesive layer AD1 is disposed between the fingerprint identification sensor 120 and the microstructures 112. Two opposite surfaces of the first adhesive layer AD1 contact the fingerprint identification sensor 120 and the microstructures 112, respectively. The first adhesive layer AD1 may be a light-transmissive adhesive layer, and may be, for example, a light-curing adhesive layer, but the invention is not limited thereto. In addition, a refractive index of the first adhesive layer AD1 mat be identical to a refractive index of the cover plate 110, which is not limited in the invention.

The light source 130 is located under the inner surface S1 and adjacent to the fingerprint identification sensor 120. FIG. 1B schematically illustrates four light sources 130, and the four light sources 130 are disposed at four sides of the fingerprint identification sensor 120; however, the amount of the light sources 130 and the relative disposition relation between the light sources 130 and the fingerprint identification sensor 120 are not limited to what is illustrated in FIG. 1B. In other embodiments, the light sources 130 may be disposed at each side, each corner or a combination thereof of the fingerprint identification sensor 120.

The light source 130 is adapted to emit the light beam L toward the cover plate 110. The light sources 130 may be visible light sources or invisible light sources. In other words, the light beam L may be visible light or invisible light. When the user presses the outer surface S2 of the cover plate 110 with the finger F, the light beam L irradiating to a crest C of the finger F (fingerprint) is reflected by the crest C, and the light beam L irradiating to a trough T of the finger F (fingerprint) is scattered by the trough T or absorbed by the finger F. The light beam L reflected by the crest C sequentially passes through the microstructures 112 located at the inner surface S1 and the first adhesive layer AD1 and is transmitted to the fingerprint identification sensor 120. Thereby, the fingerprint identification sensor 120 may identify the user's identity according to grayscale digital image of the received crest and trough.

With the microstructures 112 disposed at the inner surface S1 and the fingerprint identification sensor 120 correspondingly disposed under the microstructures 112, the light beam L reflected by the crest C is first processed (e.g., aggregated) by the microstructures 112 and then transmitted to the fingerprint identification sensor 120. With the use of the aggregation characteristics of the microstructures 112, intensity of light signals received by the fingerprint identification sensor 120 may be effectively increased, which contributes to improving the identification performance of the fingerprint identification sensor 120. Additionally, the microstructures 112 are directly attached to the fingerprint identification sensor 120 through the first adhesive layer AD1, and no other optical elements (e.g., a light guide plate) for light guiding or aggregating have to be disposed between the fingerprint identification sensor 120 and the inner surface S1, thus, an optical path length between the finger F and the fingerprint identification sensor 120 may be shortened, which contributes to reducing an amount of signal attenuation resulted from the optical path length. Therefore, the fingerprint identification module 100 can have good identification performance.

Figure 2:
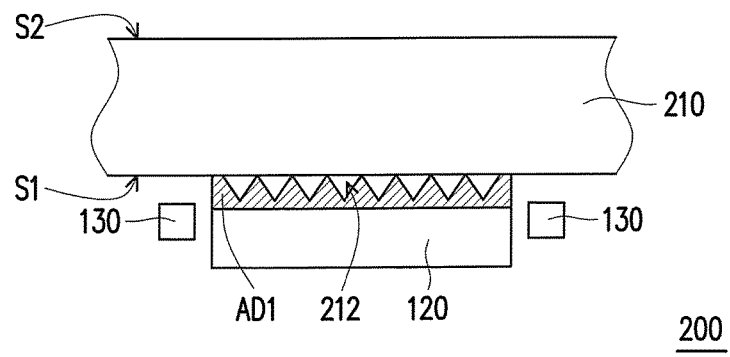
FIG. 2 and FIG. 3 are schematic cross-sectional diagrams respectively illustrating fingerprint identification modules according to a second embodiment and a third embodiment of the invention.
Figure 3:
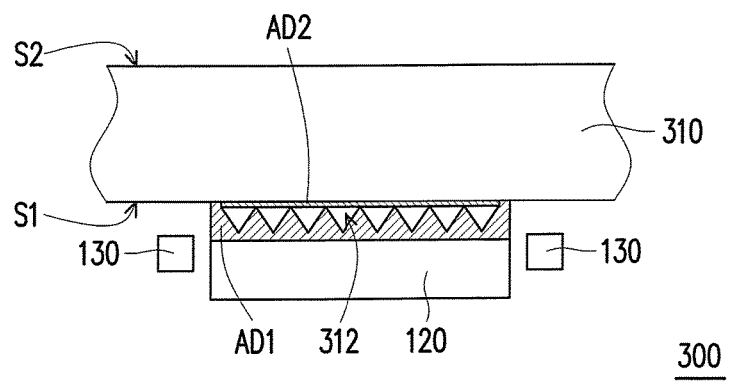

FIG. 2 and FIG. 3 are schematic cross-sectional diagrams respectively illustrating fingerprint identification modules according to a second embodiment and a third embodiment of the invention. Referring to FIG. 2 first, a fingerprint identification module 200 is similar to the fingerprint identification module 100 illustrated in FIG. 1A, where the same or similar elements are labeled by the same or similar reference numerals, and the materials, the relative disposition relation, the manufacturing method and effects thereof will not be described hereinafter. The main difference between the fingerprint identification module 200 and the fingerprint identification module 100 is that the microstructures 212 are prism structures protruding from the inner surface S1 of the cover plate 210, but the invention is not limited thereto. In another embodiment, the microstructures 212 may also be columnar structures (e.g., triangle columnar structures or semi-cylindrical structures) protruding from the inner surface S1 of the cover plate 210.

Referring to FIG. 3, a fingerprint identification module 300 is similar to the fingerprint identification module 200 illustrated in FIG. 2, where the same or similar elements are labeled by the same or similar reference numerals, and the materials, the relative disposition relation, the manufacturing method and effects thereof will not be described hereinafter. The main difference between the fingerprint identification module 300 and the fingerprint identification module 200 is that the fingerprint identification module 300 further includes a second adhesive layer AD2, and microstructures 312 are attached to an inner surface S1 of a cover plate 310 through the second adhesive layer AD2. Specifically, the microstructures 312 and the cover plate 310 may be separately manufactured and then attached together through the second adhesive layer AD2. The second adhesive layer AD2 may be a light-transmissive adhesive layer and may be, for example, a light-curing adhesive layer, but the invention is not limited thereto. In addition, a refractive index of the second adhesive layer AD2 may be identical to a refractive index of the cover plate 310, but the invention is not limited thereto.

In light of the foregoing, the invention can facilitate in improving the identification performance of the fingerprint identification sensor by centralizing and aggregating a light beam reflected by a finger on the fingerprint identification sensor with the disposition of the microstructures. In addition, the fingerprint identification sensor is directly attached to the microstructures, such that the optical path length between the finger and the fingerprint identification sensor can be shortened, which contributes to reducing the amount of signal attenuation resulted from the optical path length. Therefore, the fingerprint identification module of the invention can have good identification performance.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A fingerprint identification module, comprising:
   a cover plate, having an inner surface, an outer surface opposite to the inner surface, and a plurality of microstructures located at the inner surface;
   a fingerprint identification sensor, located under the microstructures;
   a first adhesive layer, wherein the fingerprint identification sensor is attached to the microstructures through the first adhesive layer; and
   at least one light source, located under the inner surface and adjacent to the fingerprint identification sensor.

2. The fingerprint identification module according to claim 1, wherein the cover plate is a glass cover plate of a display apparatus or a glass cover plate of a touch apparatus.

3. The fingerprint identification module according to claim 1, wherein the microstructures are hollow structures recessed in the inner surface.

4. The fingerprint identification module according to claim 1, wherein the microstructures are prism structures or columnar structures protruding from the inner surface.

5. The fingerprint identification module according to claim 1, wherein the microstructures and the cover plate are integrally formed.

6. The fingerprint identification module according to claim 1, further comprising:
   a second adhesive layer, wherein the microstructures are attached to the inner surface of the cover plate through the second adhesive layer.

7. The fingerprint identification module according to claim 6, wherein the second adhesive layer is a light-curing adhesive layer.

8. The fingerprint identification module according to claim 1, wherein the fingerprint identification sensor is an optical fingerprint identification sensor or a photoelectric hybrid fingerprint identification sensor.

9. The fingerprint identification module according to claim 1, wherein the first adhesive layer is a light-curing adhesive layer.

10. The fingerprint identification module according to claim 1, wherein an amount of the at least one light source is plural, and the light sources are respectively disposed at each side, each corner or a combination thereof of the fingerprint identification sensor.

* * * * *